United States Patent [19]

Satake et al.

[11] Patent Number: 5,051,639
[45] Date of Patent: Sep. 24, 1991

[54] Y-DELTA CONVERSION SWITCHES ON DUAL STATOR INDUCTION MOTOR

[75] Inventors: Toshihiko Satake, Higashihiroshima; Yukio Onogi, Hiroshima, both of Japan

[73] Assignee: Satake Engineering Co., Ltd., Tokyo, Japan

[21] Appl. No.: 588,587

[22] Filed: Sep. 26, 1990

[30] Foreign Application Priority Data

Sep. 27, 1989 [JP] Japan .................................. 1-252662

[51] Int. Cl.$^5$ .......................... H02P 1/32; H02P 5/28; H02P 8/00; H02P 13/06
[52] U.S. Cl. .................................. 310/112; 310/68 R; 318/771
[58] Field of Search ...................... 310/68 R, 112, 116; 318/771

[56] References Cited

U.S. PATENT DOCUMENTS 2,182,646 12/1939 Shutt .................................. 318/771
4,785,213 11/1988 Satake .................................. 310/116

Primary Examiner—Steven L. Stephan
Assistant Examiner—D. L. Rebsch
Attorney, Agent, or Firm—Fish & Richardson

[57] ABSTRACT

An induction motor including a single rotor formed in one-piece and first and second stators disposed side by side has a phase changing device for varying the phase difference between the rotational magnetic field generated by the first stator and that generated by the second stator. The phase changing device comprises a first-connection changing switch for making the interconnection of respective stator windings of the stators the first series delta-connection in which the phase difference is 0° when it is in its closed-state and a second-connection changing switch for making the respective stator windings the second series data-connection in which the phase difference is 120° when it is in its closed-state. When both the first- and second-connection changing switches are closed, the interconnection of the stator windings becomes a parallel Y (or star)-connection in which the phase difference produced is 60°. During the motor operation, at least one of the first-switch and the second-switch is always kept in its closed-state. The motor exhibits three different torque curves suitable for starting operation, an intermediate speed operation and normal or steady-state operation by the switching operation of the first- and second-switches.

7 Claims, 6 Drawing Sheets

Y-DELTA CONVERSION SWITCHES ON DUAL STATOR INDUCTION MOTOR

BACKGROUND OF THE INVENTION

The present invention relates to an induction motor having a single rotor and a plurality of stators which can start smoothly and output a high driving torque in a wide range from a low speed range to a high speed range and, more particularly, to a phase changing system for the motor which effects a phase shifting operation in the rotating magnetic fields around the rotor conductive members of the rotor, generated by the stators surrounding the rotor.

As for the methods for controlling the torque and speed in an induction motor of the type having a plurality of stators, a conventional method available is to cause phase differences between the stators. A mechanical system for effecting such phase differences may have an arrangement wherein the relative rotation of stators is relied upon to produce a phase difference and, an electrical system therefor may have an arrangement wherein the connections of stator windings are changed to produce several kinds of phase differences. Other available systems include one wherein Y-Δ-connection changing system is combined.

Any appropriate method is selected in a number of different ways from among the above methods or systems according to the characteristics of load connected to the motor or the use of the motor, such as the need to meet the load by changing the torque or the speed of the motor and the need to make a smooth increase in the speed at the starting of the motor.

The present invention provides an arrangement in which certain stepwise phase differences are provided to meet the load connected and which may be regarded as falling within the electrical systems for effecting phase changes as referred to above in the explanation of the conventional methods.

In the conventional electrical systems explained above, the phase changing is effected by the connection-changing of the stator windings, so that, while the phase differences available can be of 0°, 60°, 120°, 180° in electrical angles, the number of the switches required will exceed a dozen or more. This is one of the reasons for the high manufacturing cost of such system.

There is also an ordinary induction motor in which a Y-Δ -connection changing system is provided for the purpose of improving the starting characteristics of the motor. In such a motor, despite the provision of only one stator, its wirings are quite complicated.

SUMMARY OF THE INVENTION

The present invention, therefore, aims at providing a phase changing system in which, while the torque characteristics based on the phase differences as obtained by the conventional methods are retained, only the minimum number of switches is required for the switching operation, resulting in a considerable reduction of the cost for manufacturing.

According to the present invention, there is provided an induction motor including a single rotor formed in one-piece having a first and a second rotor core axially mounted on a common axis with an airspace or a non-magnetic portion being provided between the two rotor cores and having on the two rotor cores a plurality of rotor conductive members extending therethrough; a first and a second stator disposed side by side and surroundingly facing the respective rotor cores, the first and second stators having a first and a second stator core on which a plurality of windings of polyphase being wound; and a phase changing means for varying the phase difference between the rotational magnetic fields around the first rotor core generated by the first stator and the rotational magnetic fields around the second rotor core generated by the second stator, the phase changing means comprising:

a first-connection changing switch, disposed between the stator windings of the first stator and the stator windings of the second stator, for making the interconnection of the respective stator windings a series Δ-connection in which the phase difference is 0° when it is in its closed state; and a second-connection changing switch, disposed between the stator windings of the first stator and the stator windings of the second stator, for making the interconnection of the respective stator windings a series Δ-connection in which the phase difference is 120° when it is in its closed state, at least one of the first-switch and the second-switch being adapted to be always closed during the motor operation.

The first-and the second-connection changing switch in the system according to the present invention provide respectively a phase difference of 0° and a phase difference of 120° in the electric angle between the stators. More specifically, there will be obtained the phase difference of 0° when the first-connection changing switch (hereinafter simply referred to as a "first-switch") is closed and the current is supplied therethrough, and also obtained the phase difference of 120° when the second-connection changing switch (hereinafter also referred to as a "second-switch") is closed and the current is supplied therethrough.

In the motor of the present invention, both the first- and second-switches are simultaneously closed and the current is supplied. Here, the phase difference obtained between the two stators is 60°. Accordingly, by the simple operation of either one of the first-and the second-switch or of both the switches, it is possible to obtain three different phase differences, namely, 0°, 60° and 120° in electrical angles.

The operations of the induction motor of the invention may be summarized as follows: First, when the second-switch alone is closed and then the current is supplied, the motor starts at the maximum phase difference of 120°. Thereafter, the load is accelerated along the torque characteristic curve of the phase difference of 120°. Next, after the lapse of a predetermined time or after the reaching of the rotational speed to a predetermined number, the first-switch is switched on while the second-switch is being retained at its closed state, thereby changing the phase difference to 60°. The load is further accelerated along the torque characteristic curve of the phase difference of 60° thereby causing an increase in the rotational speed of the motor. Lastly, upon the lapse of the predetermined time period after the switching-on of the first-switch or upon the reaching of the rotational speed to the predetermined number, the opening of only the second-switch causes the phase difference to become 0° and thereafter the motor drives the load connected thereto along the torque characteristic curve as in an ordinary induction motor.

As explained above, it is possible to change the phase differences in three steps only by the switching operations of the two switches, namely, the first-and the second-connection changing switch, and to provide a phase changing system in which the number of the connection-switches required for effecting the necessary switching operation is considerably smaller than that required in a conventional device. Also, as already explained hereinbefore, since at least either one of the two switches is in its on-state or closed-state constantly during the period in which the current is flowing, the capacities of the contacts of the first-and second-switches can be made small. Furthermore, since at least either one of the two switches is constantly in its on-state, there is no possibility of the load current being interrupted during the operation and, therefore, no possibility of the driving torque becoming zero either. Also, even in case any switching faults due to the on-state of one or both of the switches are caused, for example, by the fusing together of connection contacts of the switches, there is no possibility of such faults developing into any electrical trouble because the presence of the state in which both the first-switch and the second-switch are simultaneously in their on-states.

In the induction motor according to the present invention, the number of wirings necessary to complete the connection of a power supply source and the connection of the phase changing system comprising the first-and the second-connection changing switch is three lines for the power supply source and six for the phase changing system, totaling to nine lines for the specification of a three-phase motor. Where the phase changing system is provided at the side of the power supply source, the number of wirings necessary is six lines from the motor side and three lines from the power supply source side, which presents some difficulties in the setting or installation of this induction motor at a job site. However, by the consolidation of the phase changing system and the motor and the application of the fixed wirings thereto, it becomes sufficient that only three wiring lines be used at the power supply source side and this facilitates the installation of the induction motor at any job site. In an ordinary motor of a large size, the six lines required for effecting the Y-Δ starting render the wiring work complicated. However, in the induction motor according to the present invention, the phase changing system and the induction motor are formed as a unit so that the number of wirings necessary for the operation is only three lines for the power supply source. Thus, even for a large size motor, it is only necessary to confirm, at a job site, the wiring to the three power source lines and the direction of rotation of the motor in the same manner as is the case with a small size motor.

BRIEF DESCRIPTION OF THE DRAWINGS

The above and other objects, features and advantages of the present invention will be apparent from the following description of preferred embodiments of the invention, with reference to the accompanying drawings, in which.

PREFERRED EMBODIMENTS OF THE INVENTION

The present invention is herein explained mainly in relation to a phase changing device for an induction motor having a squirrel-cage type rotor and two stators but it is to be understood that the invention is not limited thereto. It is possible for the invention to be embodied in an induction motor of a wound-rotor type, or be combined with the switching of Y-Δ connections of the stator windings in order to achieve the diversification of torque characteristics. Between the rotor cores, there may be an airspace, a non-magnetic core or a magnetic core.

The applicant in the present patent application has already disclosed in detail in U.S. Pat. No. 4,785,213, issued on Nov. 15, 1988, entitled "Variable Speed Controllable Induction Motor" the construction and the function of an induction motor having a single rotor and a plurality of stators.

Figure 1:
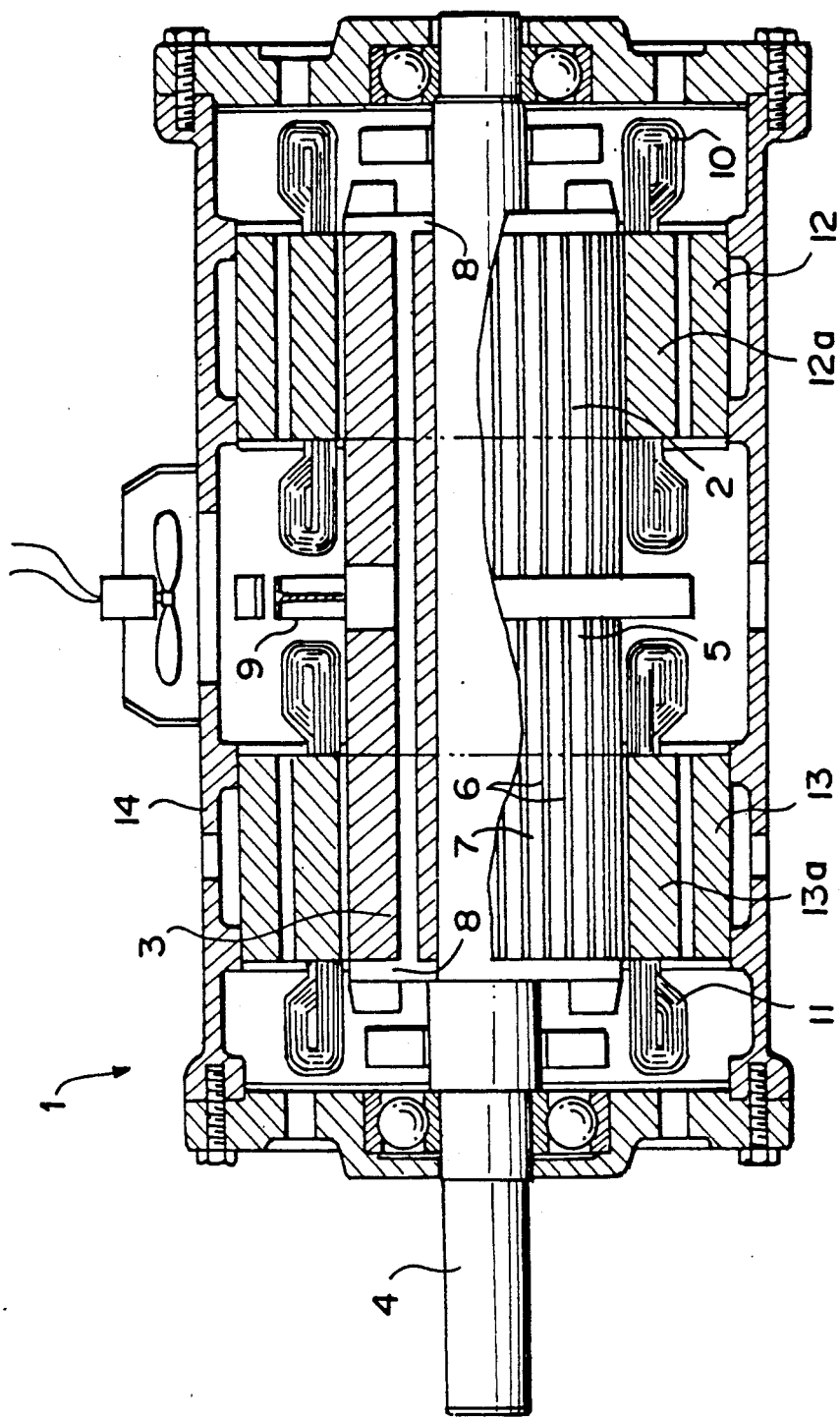
FIG. 1 is a sectional view, partly broken away, of the induction motor according to the present invention.

FIG. 1 illustrates a part of the induction motor which is an embodiment of the present invention. The numeral 1 represents the induction motor with a plurality of stators, the motor generally having arrangements as follows: Rotor cores 2, 3 of magnetic material are mounted on a rotor shaft 4 with a predetermined space being provided therebetween. Between the rotor cores 2 and 3, there may be provided either a non-magnetic core 5 or an airspace. Respective rotor conductive members 6 . . . mounted on the rotor cores 2, 3 are connected so as to extend through thereon thereby forming a unitary rotor 7 and, both ends of the conductive members 6 . . . are short-circuited by short-circuit rings 8, 8. Also, in this configuration, the rotor conductive members 6 . . . mounted on the rotor 7 are short-circuited, at the non-magnetic core portion 5 between the rotor cores 2, 3, by resistive members 9 . . . . The resistive members 9 allow the flow of current when there exist predetermined vector differences in the currents flowing in the conductive members 6 . . . . All the conductive members 6 . . . mounted on the rotor 7 are not necessarily short-circuited by the resistive members 9 . . . and only some of them may be short-circuited depending on the load characteristics of the load connected.

First and second stators 12, 13 having stator windings 10, 11 provided on stator cores 12a, 13a are disposed side by side surroundingly facing the rotors 2 and 3, respectively. The first and second stators 12, 13 are fixedly mounted on a machine frame 14.

The stator windings 10, 11 of the first and second stators 12, 13 are connected with each other so as to form a series Δ-connection.

Next, the embodiment of the present invention is explained with reference to FIG. 2 et seq.

Figure 2:
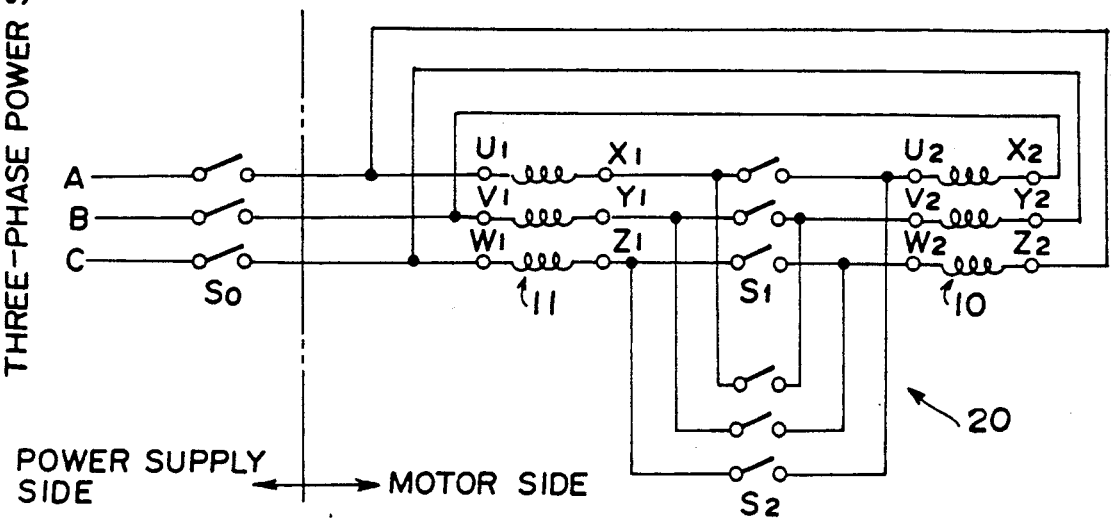
FIG. 2 is a connection diagram of the phase changing device of the induction motor according to the present invention.

FIG. 2 shows a diagram of wiring connections. The stator windings 11 for respective phases are at one-side ends ($U_1$, $V_1$, $W_1$) connected to the respective phases A, B, C of the three-phase power supply source through power switching means $S_o$ and are at the other-side ends ($X_1$, $Y_1$, $Z_1$) connected to one-side contacts of the first connection changing switch $S_1$. Also, the respective stator windings 10 for respective phases are at one-side ends ($U_2$, $V_2$, $W_2$) connected to the other-side contacts of the first connection changing switch $S_1$ and are at the other side ends ($X_2$, $Y_2$, $Z_2$) connected to the respective phases B, C, A of the three-phase power supply source through the power switching means $S_o$. One-side contacts of second-connection changing switch $S_2$ are connected in parallel at junction points between the one-side contacts of the first connection changing switch $S_1$ and the stator windings 11 and, the other-side contacts thereof are connected to the one-side ends ($U_2$, $V_2$, $W_2$) of the stator windings 10 in such a manner that there will be a phase difference of 120° in the electrical angle between the stator windings 10 and the stator windings 11.

Hereinafter the relevant operation is explained.

Figure 3:
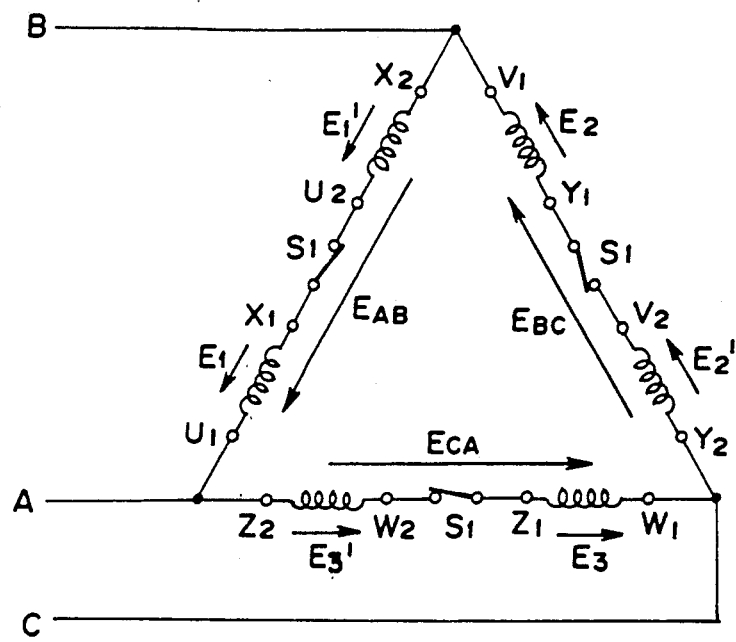
FIG. 3 shows a delta-connection of the phase difference of 0° where only the first connection changing switch is closed.

First, when the first-switch $S_1$ is closed and thereafter the power source switch $S_o$ is closed, the stator windings 11 and the stator windings 10 form a series Δ-connection with respect to the three-phase power sources A, B, C as shown in FIG. 3. That is, the winding $U_1$-$X_1$ of the stator windings 11 and the winding $U_2$-$X_2$ are in series and, likewise, $V_1$-$Y_1$ and $V_2$-$Y_2$ as well as $W_1$-$Z_1$ and $W_2$-$Z_2$ are also in series with the phase difference then being 0°. The voltage across the respective windings is one half of the line to line voltage of the power supply voltage.

Figure 4A:
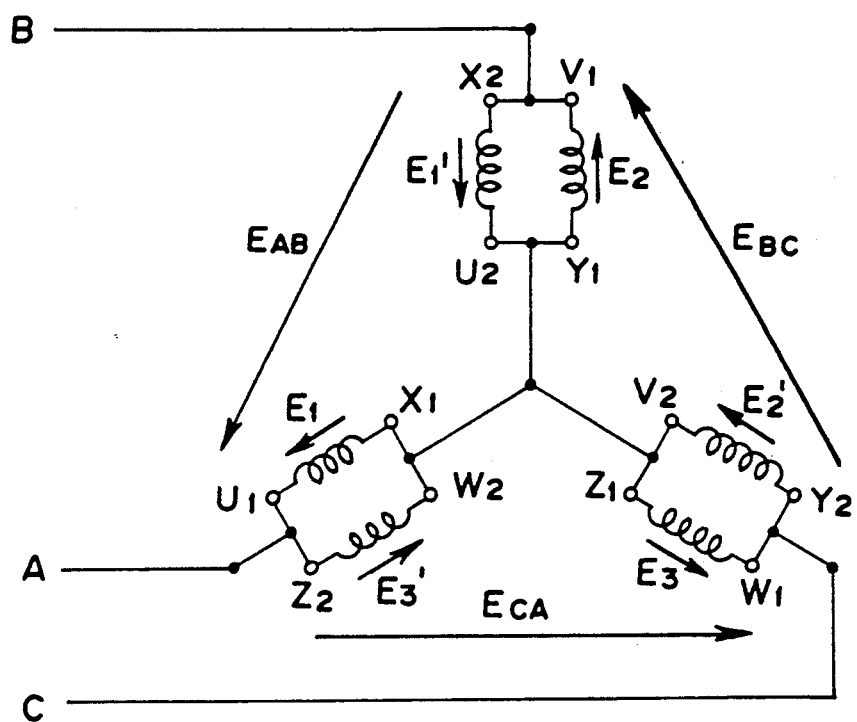
FIG. 4(a) shows a star-connection of the phase difference of 60° where both the first and second connection changing switches are closed.
Figure 4B:
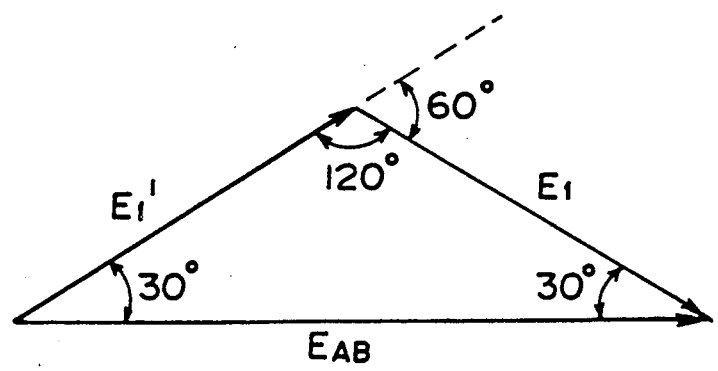
FIG. 4(b) is a vector diagram of the above star-connection.

Next, when the second-switch $S_2$ is further closed under the state in which the switch $S_1$ is closed, the stator windings 11 and the stator windings 10 form a parallel Y-connection with respect to the power supply source. The wiring connections under this state is shown in FIG. 4(a). The vector relation of the voltage $E_1$ across the winding $U_1$-$X_1$ and of the voltage $E_1'$ across the winding $U_2$-$X_2$ is as shown in FIG. 4(b) from which it is noted that the phase difference is changed to 60°. $E_{AB}$ here shows a line to line voltage of the power supply source.

The magnitude of the voltage $E_1$ at the above state is $2/\sqrt{3} = 1.15$ times larger as compared with that when the phase difference is 0°. This increase in the voltage is within the range of tolerance and does not present any problems in the operation of the motor. It is rather an advantage since the torque is increased by such increase in the voltage.

Figure 5:
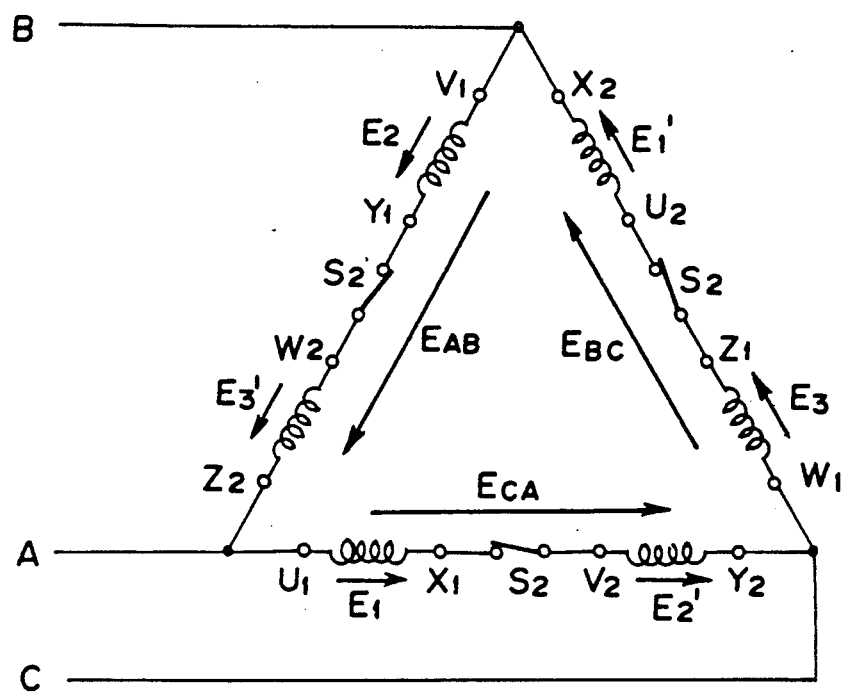
FIG. 5 shows a delta-connection of the phase difference of 120° where only the second connection changing switch is closed.

Then, when only the first-switch $S_1$ is opened while the second-switch $S_2$ is kept closed, the interconnection between the two stator windings 10 and 11 brings about the phase difference of 120° as already explained. The wiring connection under this state is shown in FIG. 5. The voltage appearing across each winding is half of the line to line voltage of the power source voltage.

As explained in the forgoing, it is possible to achieve three different phase differences by the switching of the two connection changing switches, namely, the first-switch $S_1$ and the second-switch $S_2$.

At the phase difference of 60°, the other-side ends ($X_1$, $Y_1$, $Z_1$) of the stator windings 11 and the one-side ends ($U_2$, $V_2$, $W_2$) of the stator windings 10 are in their short-circuited state so it can be understood that there will be no possibility of occurrence of any electrical trouble even if they are short-circuited by any other reasons.

Further, since the first- and second-switches $S_1$, $S_2$ for effecting the necessary phase changing are in the state in which at least either one of them is always closed during the motor operation and there is no switching transitory interruption in the load currents, it is possible to minimize the contact capacity of the switches for wiring connection switching and thereby to scale down the phase changing system comprising the first- and second-switches $S_1$, $S_2$.

As will be understood from FIG. 2, when the phase changing system having the switches $S_1$, $S_2$ are installed at the motor side, only three lines from the power source to the motor are sufficient and, unlike the case as seen in an ordinary motor of a large size, it is possible to provide a motor which operates at a high driving torque from a low speed range up to a high speed range without the need of attending to a complicated wiring process for Y-Δ starting of the motor.

Figure 6:
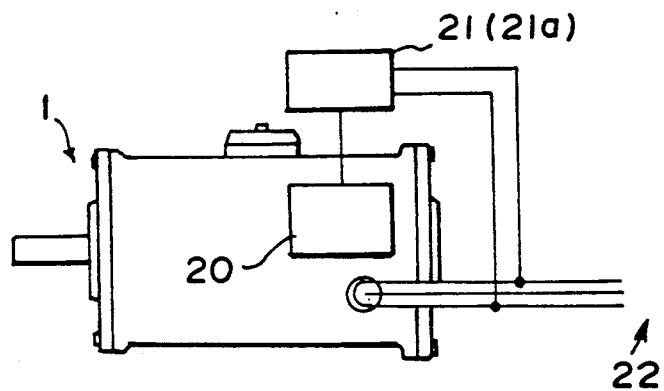
FIG. 6 is a connection diagram of the control device having a timer means to the motor.
Figure 7:
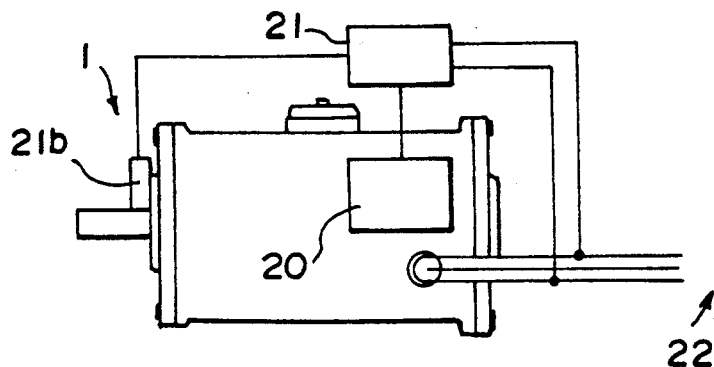
FIG. 7 is a connection diagram of the control device having a speed detecting means to the motor.
Figure 8:
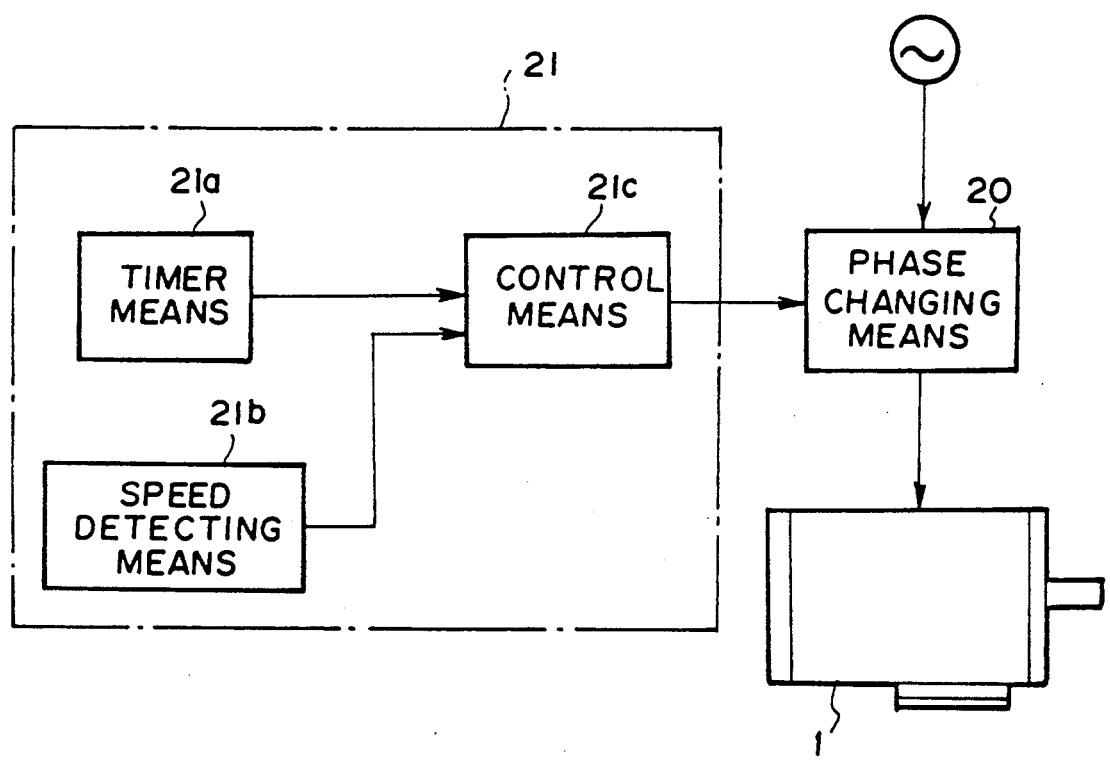
FIG. 8 is a connection diagram of the control device having both the timer means and the speed detecting means.

Now, the method of controlling the phase changing system is explained with reference to FIGS. 6 through 8. In the configuration shown in FIG. 6, the induction motor 1 is connected to a three-phase power source 22 having switching means. Also, the induction motor is provided with the phase changing system 20 in a unitary manner. To the phase changing system 20 is connected a control device 21 which incorporates a sequential circuit having a timer means 21a. As for the arrangement shown in FIG. 7, the induction motor 1 is connected to a three-phase power source 22 equipped with switching means. The induction motor is provided with the phase changing system 20 also in a unitary manner and this phase changing system 20 is connected with a control device 21 which is composed of, for example, a hard logic circuit. A signal from a speed detecting means 21b for detecting the rotational speed of the motor is inputted to the control device 21. As shown in FIG. 8, the control device 21 may have both the timer means 21a and the speed detecting means 21b and, in this case, the phase changing means 20 is controlled through a control means 21c.

The operation of the device arranged as above is hereinafter explained.

The control device 21 controls the switching of the first- and second-connection changing switches $S_1$, $S_2$ of the phase changing system 20 based on the time limits set by the timer means 21a or on the signals sent from the speed detecting means 21b.

With the control device 21 having the timer means 21a, since the normal Y-Δ starting is switched in an average time of 10 seconds, the phase difference may be 120° at the starting and the shifting up to the normal operation at the phase difference of 0° may be carried out, for example, from 120° for the starting and, subsequently, the time for shifting to the next phase difference of 60° may be set for 4–5 seconds after starting, and the time for shifting from 60° to 0° may be set for 4–5 seconds after the phase difference of 60° has taken place so that, by means of the phase changing system 20, the phase differences are shifted in three steps sequentially from 120° to 0°. Of course, the time limits set by the timer means 21a may be changed according to the load characteristics of the load connected to the motor.

The control device 21 having the speed detecting means 21b may be one which is a simple logic circuit or one in which a microprocessor is installed depending on the necessity involved. This control device 21 adopts the up-to-date technology and includes a circuit for receiving a signal from the speed detecting means 21b and for effecting any necessary conversion of such signal, a circuit for comparing the converted signal with a predetermined reference value, a circuit for memorizing the predetermined reference value, and a signal output circuit for outputting any necessary control signal based on the comparison between the converted signal and the predetermined reference value. The control signal from the signal output circuit causes the phase changing system 20 to produce the necessary phase differences in a sequential manner.

Time limits and the predetermined reference values for the control device 21 are determined by, for example, the load characteristics and the outputs of the motor. Each of the control devices is one for simply controlling the switching of the two connection changing switches so that, as a control device for the induction motor having three-step phase differences, it is possible for them to be incorporated as unitary members in the phase changing system having the connection changing switches.

The torque characteristics of the induction motor having a plurality of stators according to the present invention may of course vary, depending on the design of the motor but, since the changes of the phase differences from 180° to 120° are comparatively of a gentle slope, it is possible to use the motor almost in the same way as in a conventional one in which the phase shifting is effected by electrical shifting in four steps of 180°, 120°, 60° and 0°.

Figure 9A:
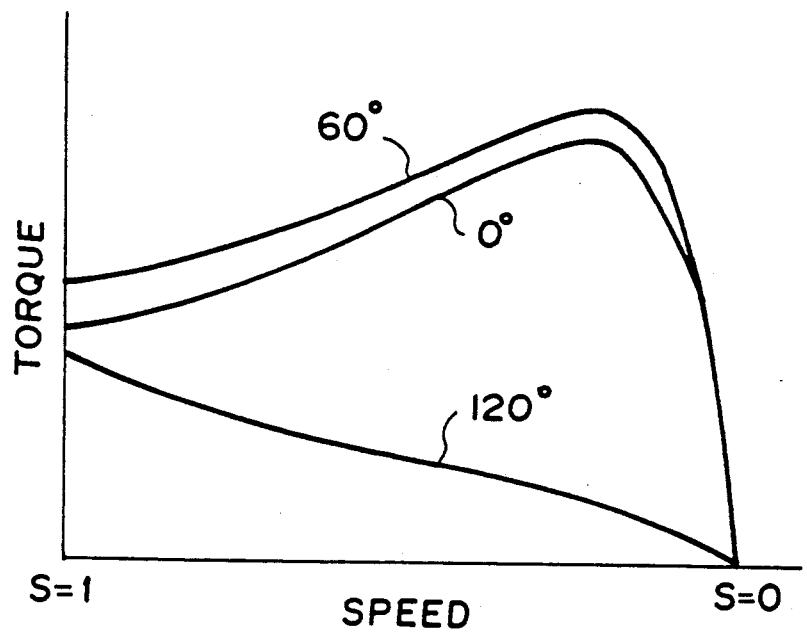
FIGS. 9(a) and 9(b) show typical characteristic curves obtained by the motor according to the invention.
Figure 9B:
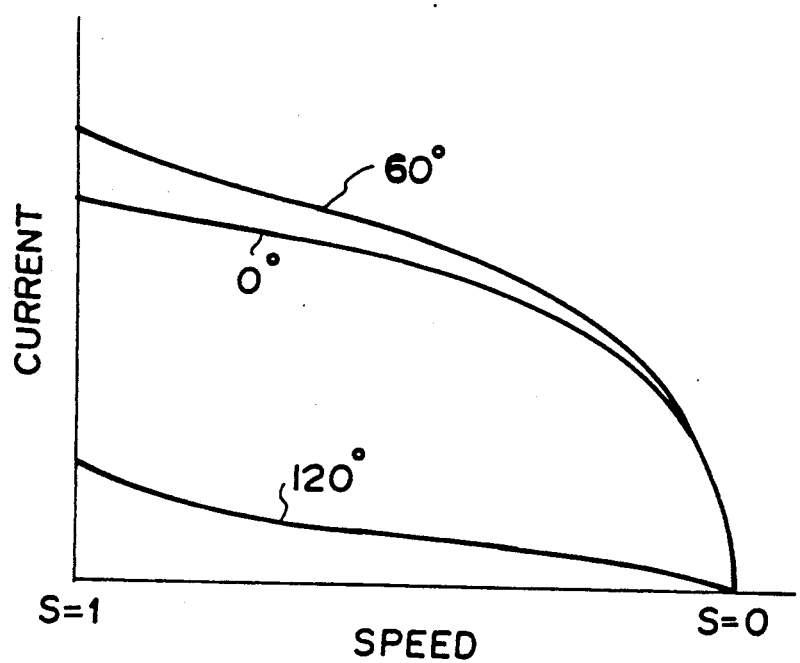

FIGS. 9(a) and 9(b) are, respectively, typical torque-speed characteristic curves and current-speed characteristic curves obtained by the induction motor according to the present invention. It can readily be understood from the above characteristic curves that the motor can easily be brought to the steady-state operation exhibiting high driving torque by the sequential switching operation of the connection changing switches upon the reaching of the rotational speed to the predetermined number after having been started under a low current. The illustrated characteristic curves are typical ones achieved by the motor according to the present invention. It is needless to say that the characteristic curves are changeable in accordance with the resistance value of the conductive members 6 . . . , that of the resistive members 9 . . . or the number of the resistive members 9. . . .

As explained above, the present invention has made it possible for the induction motor with a plurality of stators to have the phase differences set in three steps by the simple phase changing system and, moreover, such phase differences are for three different states, namely, for starting, for intermediate speed operation and for normal or steady-state operation. Especially, expect for the situation where the motor needs to be speed-variable, the motor according to the present invention is suited in meeting the demands for improving the starting characteristics for, for example, a load having constant load characteristics or declining load characteristics and in meeting the object of decreasing the starting time. Also, it is an advantage that the motor according to the present invention does not require any costly device such as an inverter.

The wiring in the motor allows the phase changing device to have a simple construction with the device being unitarily built-in the motor and with the wiring being a fixed one so that there may be only three lines of wiring for three-phase power source and that, in so far as there is no error in the confirmation of the direction of rotation, anybody can easily carry out the necessary wirings and installation of the motor.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An induction motor including a single motor formed in one piece having a first rotor core and a second rotor core axially mounted on a common axis with an airspace or a non-magnetic portion being provided between said first and second rotor cores having on said first and second rotor cores a plurality of rotor conductive members extending therethrough; a first and a second stator disposed side by side and surroundingly facing respective ones of said rotor cores, said first and second stators having a first stator core and a second stator core on which a plurality of windings of polyphase are wound; and a phase changing means for varying the phase difference between the rotational magnetic fields around said first rotor core generated by said first stator and the rotational magnetic fields around said second rotor core generated by said second stator, said phase changing means comprising:

a first-connection changing switch, disposed between the stator windings of said first stator and the stator windings of said second stator;

a second-connection changing switch, disposed between the stator windings of said first stator and the stator windings of said second stator;

said first-connection changing switch and said second-connection changing switch being for making the interconnection of said respective stator windings:

a series Δ-connection in which said phase difference is 0° when said first-connection switch is in its closed state and said second-connection switch is in its open state, a parallel Y-connection in which said phase difference is 60° when said first-connection switch is in its closed state and said second-connection switch is in its closed state, and a series Δ-connection in which said phase difference is 120° when said first-connection switch is in its open state and said second-connection switch is in its closed state;

at least one of said first-switch and said second-switch being adapted to be always closed during the motor operation.

2. An induction motor according to claim 1, which includes resistive members arranged at said airspace or non-magnetic portion disposed between said two rotor cores and in which said plurality of rotor conductive members are mutually short-circuited by said resistive members.

3. An induction motor according to claim 1, which further comprises a control device for effecting the ON/OFF controlling of said first- and/or second-connection changing switches.

4. An induction motor according to claim 3, in which said control device has a timer means for controlling the timing for closing said first-connection changing switch after the closing timing of said second-connection changing switch and also the timing for opening said second-connection changing switch after the closing timing of said first-connection changing switch.

5. An induction motor according to claim 3, in which said control device has a speed detecting means for detecting the rotational speed of the motor and for controlling the timing for closing said first-connection changing switch after the closing timing of said second-connection changing switch and also the timing for opening said second-connection changing switch after the closing time of said first-connection changing switch.

6. An induction motor according to claim 1, in which said phase changing means is mounted as one unit on a machine frame of said motor.

7. An induction motor according to claim 3, in which said control device is incorporated as a unitary member in said phase changing means.

* * * * *